United States Patent [19]

Siegel et al.

[11] Patent Number: 4,823,993

[45] Date of Patent: Apr. 25, 1989

[54] BUCKET WHEEL GATE FOR DISPENSING GRANULATED BULK MATERIAL

[75] Inventors: Wolfgang Siegel, Ravensburg; Reinhold Eck, Offenau; Dieter Heep, Berqatreute; Paul Vogel, Ravensburg, all of Fed. Rep. of Germany

[73] Assignee: Waeschle Maschinenfabrik GmbH, Ravensburg, Fed. Rep. of Germany

[21] Appl. No.: 101,079

[22] Filed: Sep. 25, 1987

Related U.S. Application Data

[63] Continuation-in-part of Ser. No. 806,972, Dec. 9, 1985, abandoned.

[30] Foreign Application Priority Data

Dec. 14, 1984 [DE] Fed. Rep. of Germany ....... 3445710

[51] Int. Cl.⁴ .............................................. G01F 11/10
[52] U.S. Cl. .................... 222/345; 222/368; 222/564
[58] Field of Search ............... 222/342, 355, 368, 367, 222/345, 347, 349, 344, 216, 564

[56] References Cited

U.S. PATENT DOCUMENTS 3,118,575  1/1964  McCauley ..................... 222/368 X
3,816,693  2/1957  Greaves et al. ................. 222/368 X Primary Examiner—Joseph J. Rolla
Assistant Examiner—Nils E. Pedersen
Attorney, Agent, or Firm—Bauer & Schaffer

[57] ABSTRACT

A cylindrical housing having diametrically opposed inlet and discharge openings contains a bucket wheel coaxially rotatable therein. The inlet opening is provided with an insert having an inclined upper surface and an edge for prestripping the grain material. The insert is further provided with a stripping edge forming an angle with the cylindrical generatrix formed by the surface edge of the blades of the rotating bucket wheel which angle is at least equal to the angle of friction between the bulk material and the material out of which the gate is formed. In addition, a canopy displacing wall is arranged in the inlet opening at the level of the end of the stripping edge to displace the material moving through the feed inlet. The wall has a width of such a dimension that the cavity formed beneath it is equal to at least the volume of the granulate material stripped from the stripping edge.

8 Claims, 2 Drawing Sheets

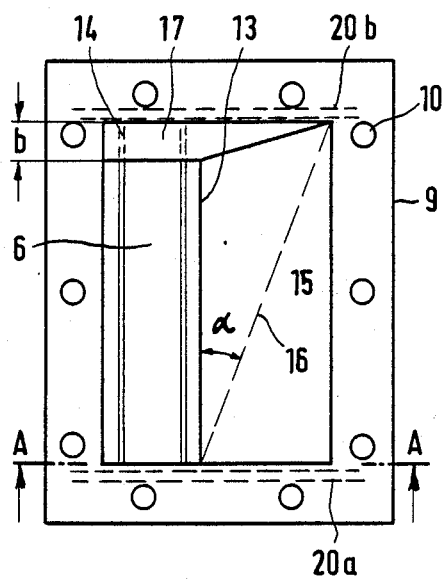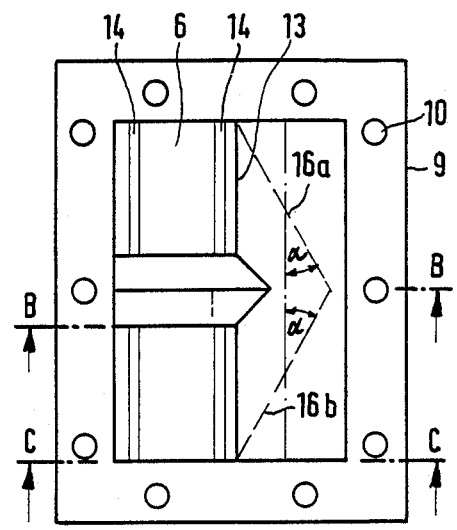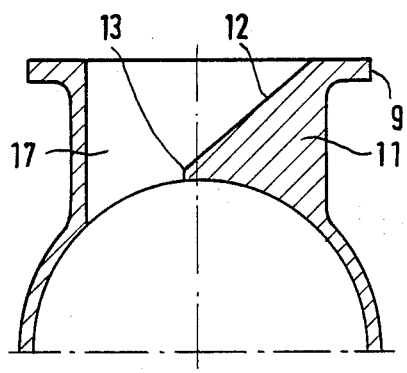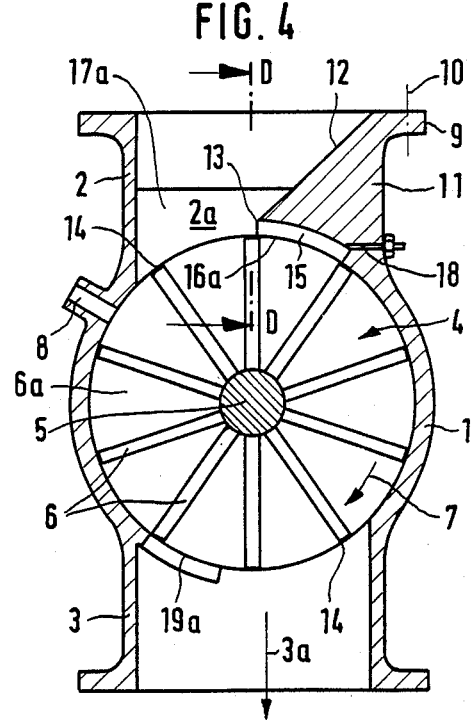

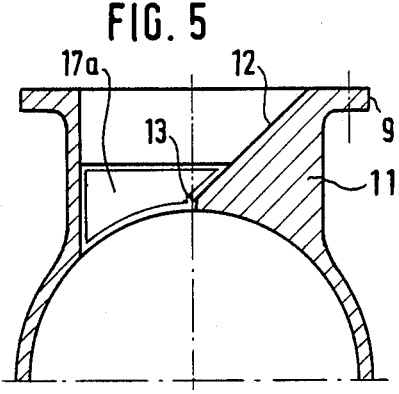
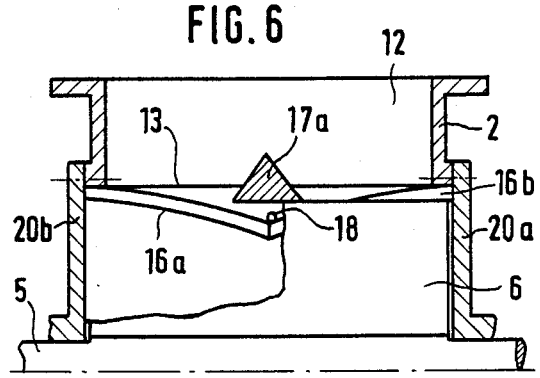
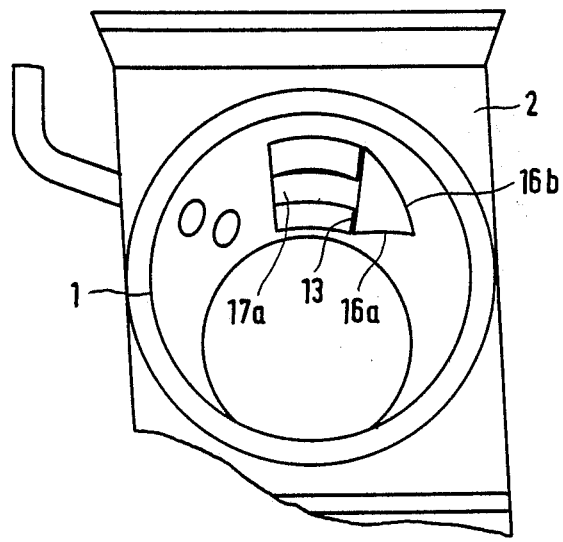
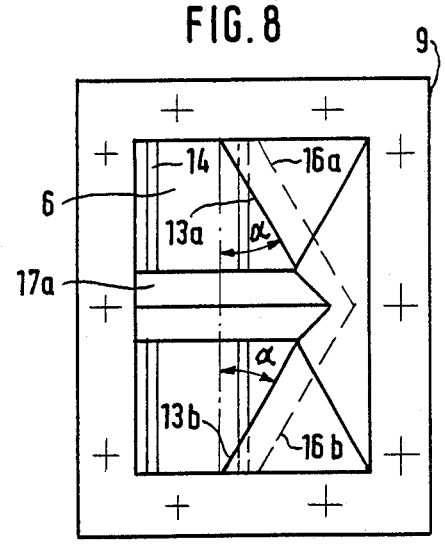
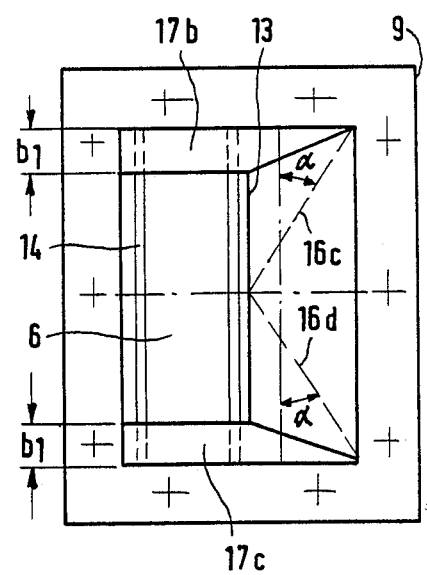

BUCKET WHEEL GATE FOR DISPENSING GRANULATED BULK MATERIAL

RELATED APPLICATION

This patent application is a continuation-in-part of copending application, Ser. No. 806,972 filed Dec. 9, 1985, now abandoned.

BACKGROUND OF THE INVENTION

The present invention relates to a bucket wheel sluice gate and in particular to a gate for dispensing predetermined amount of granular materials from a bulk source to given user.

In general, a bucket wheel gate comprises a cylindrical housing, having a feed inlet opening to a source, such as a silo of granulate material and a discharge outlet opening to a processing user of the material. Located within the housing is a wheel formed of a plurality of radially disposed blades forming, between adjacent blades, cells or bucket chambers, which as the wheel rotates are filled with the granulated material entering the feed inlet and are discharged as the feed cavity passes the discharge opening.

Efforts have been made to prevent overfilling of the individual cells of the bucket wheel both when the bucket wheel is at a standstill, and when the wheel is being rotated. Such overfilling causes the excess bulk material to be squeezed between the edges of the blade and the edges of the housing defining the cross-section of the feed inlet and discharge outlet in the direction of rotation of the wheel. This is a particular problem in that should the bulk material become lodged between these edges, the bucket wheel may be difficult or impossible to start from a standstill position. Even during operation, the shearing off of the bulk material at the aforementioned edges leads to considerable development of noise, an increased demand for driving power and greatly increases wear on the wheel components as well as the motive means. In addition, the granular structure of the bulk material is itself destroyed.

In order to avoid overfilling of the cells of the bucket wheel, when in the standstill condition, a shut-off device such as a shutter or valve is generally provided in the inlet. Two other possibilities for avoiding overfilling during operation have also been simultaneously attempted. One method provides for an arrangement in which the inlet or the inlet cross section is layed out eccentrically in relation to the central axis of the housing which axis passes through the shaft of the bucket wheel. In this manner, with a suitable division of the bucket wheel into individual cells or chambers, the natural angle or slope (a/k/a angle of repose; German=natuerliche Boeschungswinkel) of the bulk material insures that the chambers in communication with the inlet are only partially filled. As used in the foregoing text, the term "Boeschungswinkel" means the angle between the horizontal plane and the natural slope of the mass of bulk material, deposited on this horizontal plane for example by emptying a bag. The angle of this natural slope is a characteristic feature of the specific bulk material and is related mainly with the internal coefficient of friction the material. Another possibility made use of in the known bucket wheels provides for a reduction in the cross section, of the feed inlet, by employing an baffle in the inlet. This baffle insures that at any rate of operation, starting from the rated rotational speed of the bucket wheel, the quantity of bulk material fed to each chamber is smaller than the volume of the cell or chamber traversing the inlet. This arrangement is similar to that earlier described in that the cells or chambers are only partially filled.

In any case, the prior art attempts, noted above, have a decided disadvantage in that the dosing volume of the gate cannot be utilized completely since there is no assurance that there is uniformity even in the partial filling of each cell and that a control of the dosing by changing the speed of the bucket wheel can only be made within a very limited range.

In another attempt, the baffle was provided with a prestripping edge by which the overfill was moved aside before filling the chambers. Despite the use of such a prestripping edge, the grains of bulk material inevitably accumulate on the edge surfaces of the blades as well as in the area lying in front of the housing edge in the running direction so that they become jammed and sheared off between the front edge of the blade and the edge of the housing. This necessitates not only an increased demand for driving power but causes a characteristic hacking noise as well as increased wear in the gate. In addition, the baffle of this type is only effective when the gate is at operative speed since the chambers are overfilled even at a standstill. In this condition, starting difficulties, or even a blockage of the drive motor may occur when the wheel is again turned on.

In order to at least reduce the additional requirement for drive power and avoid the development of noise it is known to form the first edge of the housing traversed by the blade in the running direction after passing the inlet, so that it extends not in parallel to edge of the blades but at an angle to the blades so that the grains of the bulk material are no longer sheared off simultaneously but sequentially. In any event, this attempt did not eliminate shearing or jamming nor the need for increased power nor the elimination of noise.

The present invention has as its object the production of a bucket wheel gate in which the shearing off of grains of bulk material between the engaging edges of the blades and the housing are avoided in every state of operation.

It is another object of the present invention to provide a bucket wheel gate by which increased speed and more accurate dosing can be obtained.

The foregoing objects together with other objects and advantages will be apparent from the following description.

SUMMARY OF THE INVENTION

According to the present invention a bucket wheel sluice gate is provided comprising a cylindrical housing having diametrically opposed inlet and discharge openings and containing a bucket wheel coaxially rotatable therein. The inlet opening is provided with a baffle having an inclined upper surface and an edge for prestripping the grain material carried thereagainst by the wheel. The baffle is further provided with a stripping edge forming an angle with the cylindrical generatrix formed by the surface edge of the blades of the rotating bucket wheel which angle is at least equal to the angle of friction (German=Reibungswinkel) between the bulk material and the material out of which the gate is formed. The term "Reibungswinkel" means the angle between a horizontal plane and a plate of a chosen material (for instance a polished steel-plate) inclined to such an extent that a small amount of the bulk material in question, deposited on that surface just begins to slide downward on the inclined plane formed by said plate. In addition, a canopy displacing wall is arranged in the inlet opening at the level of the end of the stripping edge to displace the material moving through the feed inlet. The wall has a width of such a dimension that the cavity formed beneath it is equal to at least the volume of the granulate material stripped from the stripping edge.

The invention is therefore based upon the basic idea of causing that portion of the granular material which, after passing the prestripping edge which remains outside the cylindrical jacket of the bucket wheel (i.e., normally between the frontal edges of the blades and the inner edges of the housing) to be stripped by means of the stripping edge so that the bulk material moves into the cavity formed beneath the canopy wall. In contrast, the stripping edge of the known prior art devices, act as described above as a shearing or cutting edge.

The bucket wheel gate according to the present invention has the following advantages:

The wheel can start from a standstill even when a column or head of bulk material is prefed into the inlet. Prearranged shutter or valve devices are no longer necessary.

The filling volume is almost completely utilized. A smaller gate than heretofore used may therefore be used for the same average rated quantity. At the same time, dosing can be controlled over a wide range with extremely high accuracy by merely changing the rotational speed.

Damage to the grain structure of the bulk material is avoided.

The feed inlet and the discharge outlet can be arranged so as to be substantially in size identical and symmetrical to center axis of the housing permitting simpler design for the gate housing.

In a preferred embodiment, the stripping edge as seen in plan runs in a V-shape comprising two sections symmetrically arranged to a plane of symmetry passing at a right angle to and through the center of the axis of the bucket wheel. Each of the sections begins at the fore and aft end covers especially of the cylindrical housing ad end at a point located in the plane of symmetry. This embodiment has a substantial advantage in that a small volume of air leakage occurs, even with larger differences in pressure between feed inlet and the discharge outlet because the V-shaped stripping edge occupies, as compared to the prior art prestripping edge, only half as large an angular area of the inside wall of the housing and a correspondingly larger area of the inside wall of the housing remains as a leakproof stretch.

In this embodiment it is preferred that the V point or apex of the stripping edge be pointed in the direction of rotation of the bucket wheel and that the canopy displacing wall be arranged in the center of the cross sectional opening of the feed inlet in opposition to the apex level. The canopy displacing wall will lie therefore centered in the intake opening and can be fastened securely in this position by welding the same to the housing.

In another embodiment of the present invention the stripping edges are formed so that its apex points against the rotational direction of bucket wheel so that the grains of the bulk material are stripped off in a direction moving from the central plane of symmetry to the fore and aft end covers respectively of the housing. Two canopy displacing walls are arranged at each of the fore and aft covers of the housing. Although two displacer walls are thus required, the housing can be produced in an easier manner as a single casting unit.

For practical reasons, the prestripping edge can be arranged so as to run approximately parallel to the stripping edges itself. By utilizing the relationship of the friction angle, (reibungswinkel) the granulate then glides down the prestripping edge similar to that of a plowshare. The lower surface of the canopy displacing walls follows the contour of the inner wall of the housing. This not only has technical advantages from the standpoint of manufacture, but it permits maintaining the width of the canopy, i.e., the dimension parallel to the axis of the bucket wheel as small as possible.

It is preferred to form the upper surface of the canopy displacing wall as roof shaped, (i.e. slanted upper surface) specifically corresponding to the angle of repose of the bulk material, thus, the bulk material does not remain on the canopy displacing wall, if when the gate is operated when no material is fed to it.

Surprisingly, it has been shown that the grains of bulk material had been jammed and sheared off not only at the feed inlet, but also, although to a lesser extent, at the discharge outlet, e.g., between the frontal edges of the blades and the following edge of the housing itself. This effect can be observed primarily when the grains of the bulk material adhere to the edges of the blades and/or when the gate is operated at higher speeds, resulting in a reduced discharge time and an increase of centrifugal force. It is preferred, therefore, that the area of the housing adjacent to the discharge opening be designed to have a stripping edge analogous to the stripping edge at the feed inlet. It is found that the share of bulk material carried along in the air of leakage current and therefore not discharged can be reduced as result by a factor of ten.

In addition, an air blast bore nozzle can be arranged in the housing terminating in the area of the stripping edge. Therefore, by means of a blast of air, those grains of bulk material which adhere to glide along the stripping edge up to its ends can be blown into the chambers of the bucket wheel without resulting in jamming or shearing.

Full details of the present invention are set forth in the following description and illustrated in the accompanying drawings.

BRIEF DESCRIPTION OF THE DRAWINGS

In the drawings:

FIG. 1 is a top plan view of the bucket wheel sluice gate formed according to the present invention taken in the direction looking into the feed inlet opening;

FIG. 2 is a cross sectional view taken along the line A—A of FIG. 1;

FIG. 3 is a view similar to that of FIG. 1 showing a second embodiment of the present invention;

FIG. 4 is a sectional view taken along line B—B of FIG. 3;

FIG. 5 is a sectional view taken along line C—C of FIG. 3;

FIG. 6 is a sectional view taken along line D—D of FIG. 4;

FIG. 7 is a perspective view of the housing of the gate according to the present invention as shown in FIGS. 3-6;

FIG. 8 is a view similar to that of FIG. 1 showing another embodiment of the gate of the present invention;

FIG. 9 is a view similar to FIG. 1 showing a fourth embodiment.

DESCRIPTION OF THE INVENTION

The bucket wheel gate, illustrated in the figures, comprises a substantially horizontally disposed cylindrical housing 1 unitarily formed with a first neck 2, on its upper surface, defining a feed inlet 2a and with a second neck 3, diametrically disposed on the lower surface, to define a discharge outlet 3a. Located within the housing 1 is a bucket wheel 4 fixed on an axle 5 journalled along the central axis of the housing. A plurality of spoke-like blades 6, uniformly spaced, extend radially outward from the axle 5 so as to form a plurality of similarly dimensioned cells or chambers 6a. The axle 5 is journalled in suitable bearings in the rear and aft frontal covers 20a and 20b of the housing 1 (shown in detail in FIG. 6) and is driven in the rotational direction indicated by the arrow 7 by the appropriate motive means (not shown). The housing 1 is fitted with at least one radial outlet bore 8 through which air may be discharged from within the housing. The inlet neck 2 is provided with a peripheral flange 9 provided with a plurality of holes 10 by which the entire gate may be attached by suitable screws or bolts to the discharge port of a source of bulk material, such as a silo, for example.

In FIGS. 1 and 2, a single piece baffle 11 is located within the feed inlet 2a. The baffle 11 preferably an integral part of the body 1 or neck 2 covers that part of the feed inlet cross-section substantially equal to that traversed last by chamber 6a, in relation to the running direction 7 of the wheel 4. That is, it has a dimension substantially equal to the area on the surface of the cylindrical jacket formed by the wheel rotation defined by a pair of adjacent blades 6. The baffle 11 is provided with an upper surface 12 which extends obliquely downward at an angle of at least 45 degrees to the vertical and inwardly from the top rim of the inner end of the corresponding section of the connecting flange 9, and ends in a prestripping edge 13 which has a height of about a two grain diameters of the bulk material being conveyed above the surface defined by the cylindrical jacket or rotation surface defined by the outer edges 14 of the blades 6. This cylindrical surface substantially coincides with the cylindrical inner surface of the housing 1.

Below the pre-stripping edge 13, the housing 1 is provided with a wedge shaped recess 15 which extends across the entire width of the housing from the fore end 20a, at an angle to its axis, so as to form a stripping edge 16, defining relative to the edge 14 of the blades 6, an angle α (alpha) which is at least equal to the angle of friction (Reibungswinkel) between the bulk material and the material from which the gate housing is made, which angle is previously determinable according to well known procedure and should be at least 45 degrees.

The grains of the bulk material which run under the prestripping edge 13 pass beneath the overhanging baffle 11 formed by the recess 15 and are subsequently stripped by the stripping edge 16 into a partially empty chamber 6a defined by the adjacent pair of blades 6, located below the baffle 11. To create such a cavity in the chamber, a displacing wall 17, preferably integral with the housing is arranged as a canopy in the inlet shaft adjacent the rear frontal cover of the cylindrical housing 1 (i.e., opposite the apex of the wedged recess 15.) The upper surface of the displacing wall 17 is inclined, roof-like, so as to prevent accumulation of bulk material thereon and to urge the material toward the center. On the other hand, the canopy overhang permits its lower surface to continue the surface of the inside wall of the housing 1 over a part of the chambers 6a, preventing the falling of the granulate material into that portion of chamber 6a passing beneath it. The width of the canopy displacing wall b is so dimensioned that the sloping cavity thus formed in the chamber 6 is at least and preferably somewhat larger than the volume of the bulk material being stripped off the stripping edge 16, whereby the stripped material can easily be received in the chamber.

In this way, jamming and shearing, or squeezing of the grains of bulk material between the edge surfaces 14 of the blades 6 and the inside wall of the housing 1 are for all practical purposes completely avoided. Further, the free intake cross section of the feed inlet 2a can be dimensioned in such a way that every chamber of the bucket wheel, passing beneath the feed inlet 2a, is filled completely with bulk material even when the bucket wheel is at its highest desired speed.

Therefore, a smaller bucket wheel can be obtained, not only in comparison to that of the known prior art but also one having a significantly higher material throughput, together with a very good reproducibility over a wide range and linear correlation between the gate speed and the material throughput. One can therefore use the bucket wheel of the present invention as a dosing device whereby a predetermined dose output, adjustable over a wide range, can be obtained. It is also worth noting that the bucket wheel of the present invention can be started from a standstill position, even when a column of bulk material is standing within the feed neck 2, since the baffle 11 with the prestripping edge 13 cuts through this column of material when the gate is initially started.

The preferred embodiment of the bucket wheel gate is shown in FIG. 3-7. This embodiment differs from that according to FIGS. 1 and 2 in that with an otherwise identical construction of the housing and the bucket wheel itself, the stripping edge consists of two sections 16a and 16b, each beginning at the fore and aft frontal ends 20a and 20b respectively, meeting in the central plane c of the housing which plane c extends at right angles to the axle 5. As seen in FIG. 3 the two sections 16a and 16b have a V-shaped in the direction of rotation each making a similar angle α (alpha) with the central plane c. The grains of the bulk material passing the prestripping edge 13 are thus stripped inwardly from both frontal cover ends 20a and 20b toward the center. For this reason, a relatively narrow canopy displacing wall 17a having a symmetrical roof shaped upper surface is positioned centrally and well below the upper edge of the inlet neck, along the central plane perpendicular to the axle 5 pointing in the direction of rotation. It is possible, however, that a few grains of bulk material will pile up in the area of apex of the v-shaped stripped edges 16a and 16b after the apex of the stripping edge overlaps the edges 14 of the blade, and cannot be stripped away. Nevertheless, these few grains of bulk material may be easily blown, by means of compressed air into the cavity of the next passing chamber. Compressed air is delivered by way of nozzle bore 18 connected to a source of air under pressure.

As the bucket wheel 4 traverses the discharge opening 3, each chamber 6a is emptied. In order to prevent grains of the bulk material from jamming or being sheared off along the downstream edge of the housing in the discharge outlet, this edge of the housing is also provided with a stripping edge consisting of two sections 19a and 19b analogous to the stripping edge 16a and 16b in the feed opening. Only section 19a is shown in FIG. 4. Of course, no prestripping edge is required in the discharge opening, since no head or grain column can accumulate therein.

In FIG. 8 a still further embodiment is shown. This embodiment differs from the two described earlier only in that the prestripping edge also consists of two sections 13a and 13b, the latter forming with the cylindrical generatrix or jacket of the edges 14 of the blades 6 angle α (alpha). The edges 13a and 13b run parallel to the stripping edges 16a and 16b respectively. In this manner, a plowshare like effect is obtained for the prestripping edge, as well as a larger intake cross section.

FIG. 9 is a top view of the inlet neck opening of a another embodiment in which the stripping edge consists also of two sections 16c and 16d which in contrast to the embodiments shown in FIGS. 4–7 and FIG. 8 are inclined in a reverse manner to the stripping edges earlier shown. That is, the stripping action occurs from the central plane c outwardly toward the ends 20a and 20b of the housing. In this embodiment, two canopy displacing walls 17b and 17c are provided having downward inwardly directed upper surfaces. The walls 17b and 17c are correspondingly decreased in width bl, so as to leave a sufficient inlet opening, but whereby the bulk of material tends to fall toward the center of the bucket wheel.

It will be clear from the foregoing description of the preferred embodiments that the objects and advantages enumerated earlier are obtained by the present invention. Various modification and changes have been illustrated and suggested and others will be obvious to those skilled in this art. Accordingly, it is intended that the present disclosure be taken as illustrated and not as limiting of the scope of the invention.

What is claimed is:

1. A bucket wheel gate for dispensing granulated bulk material, having a cylindrical housing provided with a feed inlet and a discharge outlet and a wheel formed by radial blades, adjacent ones of which define chambers, rotatably mounted therein about a central axis, the cross-section of said feed inlet being limited by a baffle extending from the inside wall of the housing and covering part of the feed inlet cross-section traversed last by the adjacent blades forming the chambers in relation to the running direction of the wheel, said baffle having an inclined upper surface and a circumferential lower surface spaced coaxially from the generatrix of the cylinder defined by the rotating wheel and terminating in a pre-stripping edge, said pre-stripping edge and cylindrical lower surface extending continuously across the width of the housing and lying one to two grain diameters co-arcuately above the surface of the cylinder defined by the generatrix of the rotating wheel to form a curved recess receiving the grain passing the pre-stripping edge, said recess terminating in a depending wall defining a stripping edge lying on the surface of the generatrix of the cylinder defined by the rotating wheel, said depending wall comprising two symmetrical edge sections extending at a V to each other, each of said edge sections extending symmetrically from the respective frontal edges of the housing and ending in an apex lying in the plane through the center of said housing at right angles to the axis of said wheel, and defining an angle with the genetrix of the cylinder defined by the rotating wheel, said angle being at least equal to the angle of friction (Reibungswinkel) between the bulk material and the material of which the housing is made, and a canopy displacing wall arranged in the feed inlet, at the level of the end of the stripping edge and at an inclination to the rotating wheel to form a cavity therebetween, the lower edge of said canopy lying on the surface of the generatrix defined by the rotating wheel, the width of said canopy displacing wall having such dimension that the cavity resulting beneath said canopy displacing wall equals at least the volume of the bulk material stripping off along the stripping edge of the direction of this cavity.

2. The gate according to claim 1, wherein the apex of the stripping edge is pointed towards the direction of rotation of the wheel, and that the canopy displacing wall is arranged in opposition to said apex.

3. The gate according to claim 1, wherein the apex of the stripping edge is pointed opposite to the direction of rotation of the wheel and a canopy displacing wall is arranged at each of the cylindrical ends of the housing.

4. The gate according to claim 1, wherein the pre-stripping edge runs approximately parallel to the stripping edge.

5. The gate according to claim 4, wherein the lower surface of the canopy wall lies in cylindrical generatrix defined by the rotation of said wheel.

6. The gate according to claim 5, wherein the upper surface of the canopy displacing wall is inclined downwardly over said wheel.

7. The gate according to claim 1, wherein the housing at the discharge outlet, traversed last by the blades, is formed as a stripping edge.

8. The gate according to claim 1, wherein an air-blast bore is provided opening in said housing in the area of the stripping edge.

* * * * *